United States Patent
Anand et al.

(10) Patent No.: US 11,142,603 B2
(45) Date of Patent: Oct. 12, 2021

(54) PROCESS FOR PREPARATION OF PATIROMER

(71) Applicant: Solara Active Pharma Sciences Limited, Navi Mumbai (IN)

(72) Inventors: Sivadas Anand, Thrissur (IN); Sarita Mohan Pavaskar, Sirsi (IN); Bheemashankar Kulkarni, Bengaluru (IN)

(73) Assignee: Solara Active Pharma Sciences Limited, Navi Mumbai (IN)

( * ) Notice: Subject to any disclaimer, the term of this patent is extended or adjusted under 35 U.S.C. 154(b) by 182 days.

(21) Appl. No.: 16/407,644

(22) Filed: May 9, 2019

(65) Prior Publication Data

US 2019/0352442 A1 Nov. 21, 2019

(30) Foreign Application Priority Data

May 16, 2018 (IN) .............................. 201821018281

(51) Int. Cl.
*C08F 220/22* (2006.01)

(52) U.S. Cl.
CPC ........ *C08F 220/22* (2013.01); *C08F 2800/10* (2013.01); *C08F 2810/20* (2013.01)

(58) Field of Classification Search
CPC .. C08F 8/12; C08F 8/44; C08F 220/12; C08F 220/04; C08F 220/22; C08F 2800/10; C08F 2810/20; A61K 31/755; A61K 31/78

See application file for complete search history.

(56) References Cited

U.S. PATENT DOCUMENTS

| | | | |
|---|---|---|---|
| 8,147,873 B2 | 4/2012 | Charmot et al. | |
| 8,337,824 B2 * | 12/2012 | Albrecht | A61K 31/78 424/78.1 |
| 9,228,028 B2 | 1/2016 | Tyson | |
| 9,453,092 B2 * | 9/2016 | Connor | C08F 8/12 |
| 9,908,951 B2 | 3/2018 | Connor et al. | |
| 2010/0111892 A1 * | 5/2010 | Chang | A61P 1/00 424/78.1 |
| 2012/0107381 A1 | 5/2012 | Reddy et al. | |
| 2017/0165292 A1 | 6/2017 | Mansky et al. | |
| 2017/0209481 A1 | 7/2017 | Mansky et al. | |
| 2018/0072833 A1 | 3/2018 | Chang et al. | |

FOREIGN PATENT DOCUMENTS

| | | |
|---|---|---|
| WO | 2010022380 A2 | 2/2010 |
| WO | 2010022381 A1 | 2/2010 |
| WO | 2010022382 A2 | 2/2010 |
| WO | 2010022383 A2 | 2/2010 |
| WO | 2010132662 A1 | 11/2010 |
| WO | 2013003463 A1 | 1/2013 |

* cited by examiner

*Primary Examiner* — Robert C Boyle
(74) *Attorney, Agent, or Firm* — The Webb Law Firm

(57) ABSTRACT

The present application relates to a commercially viable process for the preparation of Patiromer, a crosslinked polymer. More particularly the present application relates to a commercially viable process for the preparation of Patiromer sorbitex calcium, an active ingredient useful in the treatment of hyperkalemia.

18 Claims, No Drawings

PROCESS FOR PREPARATION OF PATIROMER

CROSS-REFERENCE TO RELATED APPLICATION

This application claims priority to Indian Patent Application No. 201821018281 filed May 16, 2018, the disclosure of which is hereby incorporated by reference in its entirety.

FIELD OF THE INVENTION

The present application relates to a commercially viable process for the preparation of Patiromer, a crosslinked polymer. More particularly the present application relates to a commercially viable process for the preparation of Patiromer sorbitex calcium.

BACKGROUND OF THE INVENTION

Patiromer sorbitex calcium (VELTASSA®), a crosslinked polymer anion of patiromer with calcium-sorbitol counterion, is a potassium binder indicated for the treatment of hyperkalemia. Patiromer sorbitex calcium is chemically known as crosslinked polymer of calcium 2-fluoroprop-2-enoate with diethenylbenzene and octa-1,7-diene, combination with D-glucitol. It is also referred as poly[(D-glucitol-calcium) 2-fluoroacrylate-co-diethenylbenzene-co-octa-1,7-diene]. The chemical structure of Patiromer sorbitex calcium is represented as formula I.

calcium-sorbitol counterion:

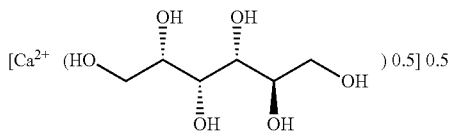

patiromer anion:

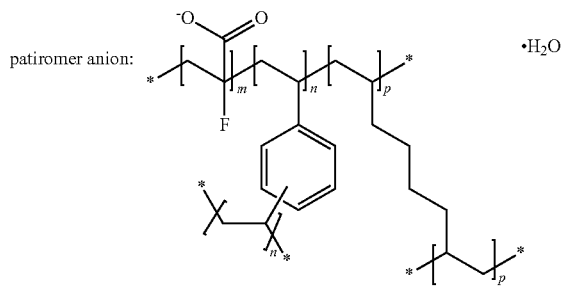

I m—number of 2-fluoro-2-propenoate groups m—0.91
n, p—number of crosslinking groups n+p—0.09
.H₂O—associated water
*—indicates an extended polymeric network Synthesis of polyfluoroacrylate polymers such as Patiromer, have been described in various patent publications including WO 2010/022380, WO 2010/022381, WO 2010/022383, WO 2010/132662 and WO 2013/003463.

However, the synthetic methods described in the prior art are not effective for commercial production and suffers from drawbacks such as high cost and formation of impurities. Another major drawback of the prior art methods is that, it leads to the production of products with inconsistent, poor or undesirable colour (such as dark brown, brownish red colour). Such products with inconsistent, poor or undesirable colour may not be ideal for formulation.

There remains a need for a commercially advantageous process for preparing Patiromer. It is therefore an object of this invention to provide a commercially advantageous and industrially viable process for preparing Patiromer which is devoid of the drawbacks of the prior art.

SUMMARY OF THE INVENTION

In an aspect, the present application provides a process for preparing Patiromer of formula IA,

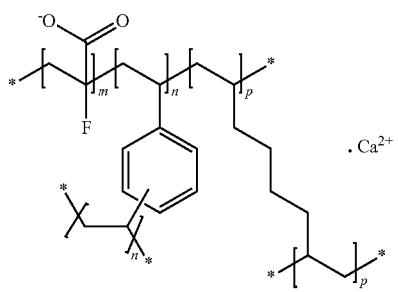

wherein,
  m is the number of 2-fluoro-2-propenoate groups, and m is equal to 0.91,
  n and p are the number of crosslinking groups, and n+p is equal to 0.09, and
  * is an extended polymeric network,
the process comprising:
forming a reaction mixture comprising a polymer of formula V,

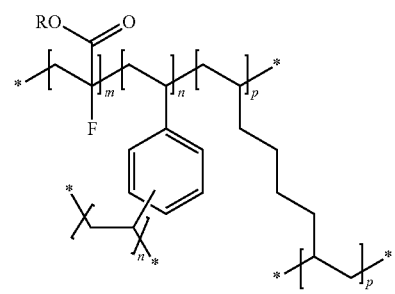

wherein,
  R is $C_{1-6}$ alkyl, and
  m, n, p and * are as defined hereinbefore,
and a base in a suitable solvent to provide a polymer of formula VI,

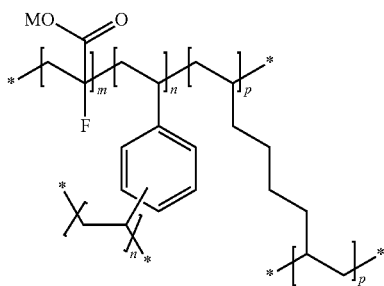

wherein,
  M is selected from the group consisting of hydrogen, lithium, sodium, potassium, rubidium, caesium, calcium, magnesium, strontium, barium, and a combination thereof, and
  m, n, p and * are as defined hereinbefore,
wherein the suitable solvent comprises an ether solvent.

In an aspect, the present application provides a process for preparing Patiromer of formula IA,

IA

[Structure of formula IA with Ca²⁺]

wherein,
  m is the number of 2-fluoro-2-propenoate groups, and m is equal to 0.91,
  n and p are the number of crosslinking groups, and n+p is equal to 0.09, and
  * is an extended polymeric network,
the process comprising:
a. reacting a polymerization mixture comprising the compounds of formulae II, III and IV,

II

[Structure of formula II]

III

IV

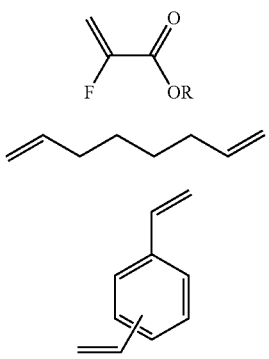

wherein R is $C_{1-6}$ alkyl,
in presence of a free radical initiator and optionally a stabilizer, in a suitable solvent to obtain a polymer of formula V,

V

[Structure of formula V]

wherein, R, m, n, p and * are as defined hereinbefore;
b. converting the polymer of formula V to a polymer of formula VI, in presence of a base in a suitable solvent,

VI

[Structure of formula VI]

wherein,
  M is selected from the group consisting of hydrogen, lithium, sodium, potassium, rubidium, caesium, calcium, magnesium, strontium, barium, and a combination thereof; m, n, p and * are as defined hereinbefore, wherein the said organic solvent is ether;
wherein the suitable solvent comprises an ether solvent, and
c. optionally converting the compound of formula VI to Patiromer of formula IA, or to
  Patiromer sorbitex calcium of formula I by subsequent steps.

DETAILED DESCRIPTION OF THE INVENTION

Definitions

Listed below are definitions of various terms used to describe this invention. These definitions apply to the terms as they are used throughout this specification, unless otherwise limited in specific instances.

All percentages and ratios used herein are by weight of the total composition and all measurements made are at about 25° C. and about atmospheric pressure, unless otherwise designated. All temperatures are in degrees Celsius unless specified otherwise.

As used herein, the terms "comprising" and "comprises" mean the elements recited, or their equivalents in structure or function, plus any other element or elements which are not recited. The term "including" is also to be construed as open ended.

The terms "about," "substantially" and the like are to be construed as modifying a term or value such that it is not an absolute, but does not read on the prior art. Such terms will be defined by the circumstances and the terms that they modify as those terms are understood by one skilled in the art.

All ranges recited herein include the endpoints, including those that recite a range between two values. Whether so indicated or not, all values recited herein are approximate as defined by the circumstances, including the degree of expected experimental error, technique error, and instrument error for a given technique used to measure a value.

The term "optionally" is taken to mean that the event or circumstance described in the specification may or may not occur, and that the description includes instances where the event occurs and instances where it does not.

Physical properties unless otherwise specified, includes for example, appearance, texture, colour, melting point, particle size, particle shape, particle size distribution, aspect ratio, bulk density, viscosity, yield stress, compressibility, surface morphology, swelling ratio and many others.

Unless otherwise specified, the word "composition" as used herein generally refers to polymer composition i.e. polymers of formulae I, IA, V and VI, which are the essential component. The composition or the polymerization mixture of the present invention may also contain components (for example surfactants, solvents, salts, buffers, polymerization inhibitors etc.) that are not chemically incorporated into the polymer The present inventors surprisingly found a process that leads to production of polymers in a more consistent and better colour, when compared to the product obtained by prior art processes.

In an aspect, the present application provides a process for preparing Patiromer of formula IA,

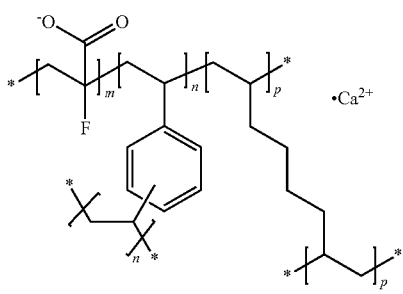

wherein,
m is the number of 2-fluoro-2-propenoate groups, and m is equal to 0.91,
n and p are the number of crosslinking groups, and n+p is equal to 0.09, and
* is an extended polymeric network, the process comprising:
forming a reaction mixture comprising a polymer of formula V,

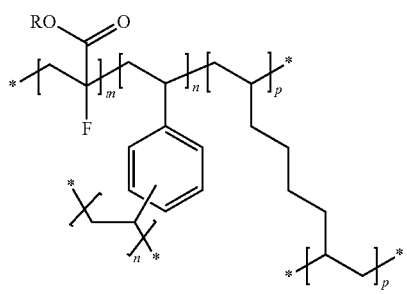

wherein,
R is $C_{1-6}$ alkyl, and
m, n, p and * are as defined hereinbefore,
and a base in a suitable solvent to provide a polymer of formula VI,

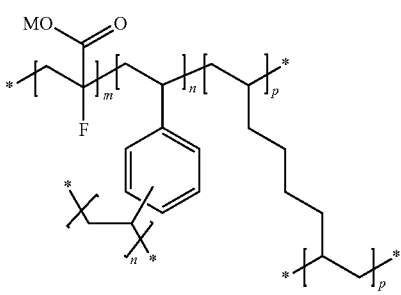

wherein,
M is selected from the group consisting of hydrogen, lithium, sodium, potassium, rubidium, caesium, calcium, magnesium, strontium, barium, and combination thereof, and
m, n, p and * are as defined hereinbefore,
wherein, the suitable solvent comprises an ether solvent.

Surprisingly it has been found that using ether solvent such as tetrahydrofuran for the reaction results in a polymer that has more consistent and better colour. The polymers produced from process described herein have better colour and reproducibility when compared to the prior art process. The process described herein consistently afford the polymers in off-white or almost white to pale yellow or cream colour. The polymers are consistently in, off-white or almost white colour. The polymers produced by the present process exhibit excellent physical properties. Such polymers are ideal and preferable for formulation.

In one embodiment, ether solvent used in forming the reaction mixture comprising polymer of formula V include but not limited to, diethyl ether, diisopropyl ether, methyl tertiary-butyl ether, dibutyl ether, di-tertiary-butyl ether, tetrahydrofuran, 2-methyltetrahydrofuran, cyclopropyl methyl ether, dioxane, dimethoxymethane, dimethoxyethane, glycol ethers such as ethylene glycol monomethyl ether, ethylene glycol diethyl ether, propylene glycol methyl ether, di(propylene glycol) methyl ether, polyethers such as polyethylene glycol, polypropylene glycol, or mixtures thereof.

In one embodiment, the ether solvent used in forming the reaction mixture comprising polymer of formula V is preferably tetrahydrofuran.

In another embodiment, the ether solvent used in forming the reaction mixture comprising polymer of formula V, optionally comprise an additional solvent selected from the group of water, alcohols, esters, amides, ketones, nitriles, aliphatic/aromatic hydrocarbons, halogenated hydrocarbons, or mixtures thereof.

In certain embodiments, the polymer of formula V used in the reaction may include:

a. direct use of a reaction mixture containing formula V polymer that is obtained in the course of its synthesis and that comprises a solvent, or by combining a solvent with the reaction mixture; or b. providing formula V polymer in a suitable solvent.

Suitable solvents useful in the reaction are as described hereinbefore.

In certain embodiments, the base useful in the reaction, can be selected from the group, lithium hydroxide, sodium hydroxide, potassium hydroxide, rubidium hydroxide, caesium hydroxide, calcium hydroxide, magnesium hydroxide, strontium hydroxide, barium hydroxide, or a combination thereof. Preferably, an aqueous strong base such as sodium hydroxide potassium hydroxide, or a combination thereof is used. The concentration of the aqueous strong base solution can range from about 10 wt. % to 50 wt. %, preferably, 20 wt. % to about 30 wt. %. In terms of mole percent, the concentration of the aqueous strong base solution can range from about 10 mole % to about 20 mole %.

In alternative embodiments, other bases can also be used in the reactions. Useful bases include an inorganic or organic base such as for example, diisopropylamine, dimethylamine, ethylenediamine, N,N-diisopropylmethylamine, 4-dimethylaminopyridine, N,N-diisopropylethylamine, triethylamine, aniline, pyridine, piperidine, potassium carbonate, potassium hydrogen carbonate, potassium acetate, potassium methoxide, sodium hydride, sodium carbonate, sodium hydrogen carbonate, sodium acetate, sodium methoxide, sodium ethoxide, sodium tert-butoxide, lithium carbonate, lithium hydrogen carbonate, lithium acetate, lithium methoxide, calcium oxide, and the like.

In alternative embodiments, the polymer of formula V can be converted to formula VI with a strong acid (for example hydrochloric acid).

In preferred embodiments, the reaction may be carried out in the absence of inert atmosphere. The use of an ether solvent in the reaction, preferably tetrahydrofuran solvent, advantageously results in polymers having consistent colour even in the absence of an inert atmosphere.

In certain embodiments, the reaction may be carried out in a substantially oxygen-free (concentration of oxygen for example, less than 5 ppm) or inert atmosphere. The inert atmosphere of the reaction mixture is provided by an inert gas selected from the group helium, neon, nitrogen, argon, krypton, xenon, or a combination thereof. Preferably, the inert gas is selected from nitrogen, argon, or a combination thereof.

In an aspect, the present application provides a process for preparing Patiromer of formula IA,

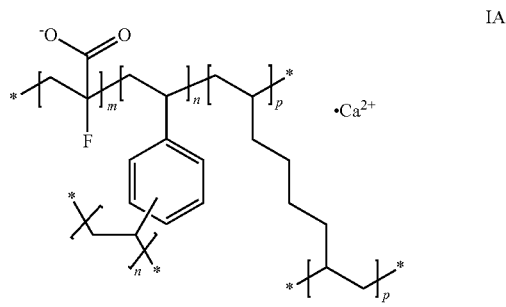

wherein,
m is the number of 2-fluoro-2-propenoate groups, and m is equal to 0.91,
n and p are the number of crosslinking groups, and n+p is equal to 0.09, and
* is an extended polymeric network, the process comprising:

a. reacting a polymerization mixture comprising the compounds of formulae II, III and IV,

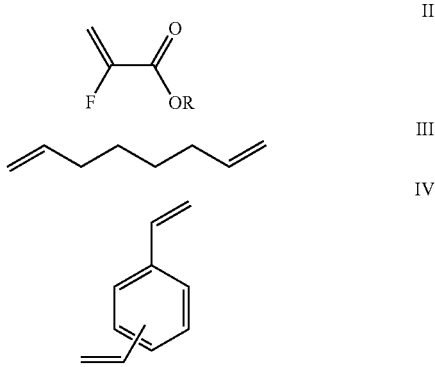

wherein, R is $C_{1-6}$ alkyl,
in presence of a free radical initiator and optionally a stabilizer, in a suitable solvent to obtain a polymer of formula V,

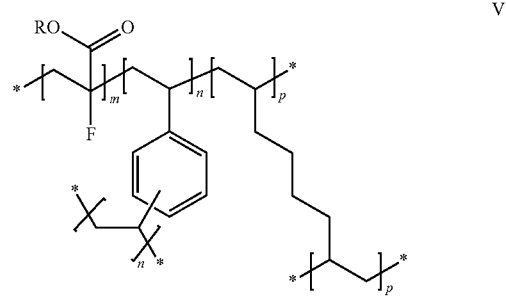

wherein, R, m, n, p and * are as defined hereinbefore;

b. converting the polymer of formula V to a polymer of formula VI, in presence of a base in a suitable solvent,

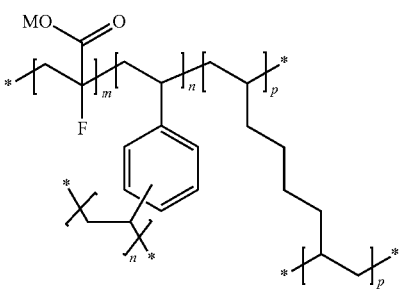

wherein,
- M is selected from the group consisting of hydrogen, lithium, sodium, potassium, rubidium, caesium, calcium, magnesium, strontium, barium, and combination thereof; m, n, p and * are as defined hereinbefore, wherein the said organic solvent is ether;

wherein, the suitable solvent comprises an ether solvent, and c. optionally converting the compound of formula VI to Patiromer of formula IA, or to Patiromer sorbitex calcium of formula I by subsequent steps.

The compounds of formula II, III and IV used in the reaction, some of which are known from the literature, may be obtained by methods known from the literature, or using methods known to one skilled in the art.

In certain embodiments, any water soluble or water insoluble free radical can be used in the reaction to provide polymer of formula V. Useful free radical initiators include, peroxides, persulfates, amines, azo type initiators, or any other suitable free radical initiator that are known in the art. Nonlimiting examples of suitable free radical initiators used in the reaction include, 2,2'-azobis(2,4-dimethylvaleronitrile), 2,2'-azobis[2-(2-imidazolin-2-yl)propane]dihydrochloride, 2,2'-azobis(2-methyl-N-(2-hydroxyethyl)propionamide), 2,2'-azobis(2-methylpropionitrile), 2,2'-azobis(2-methylpropionamidine) dihydrochloride, 2,2'-azobis[2-(2-imidazolin-2-yl)propane] dihydrochloride, 2,2'-azobis[2-(2-imidazolin-2-yl)propane] disulfate dihydrate, 2,2'-azobis[N-(2-carboxyethyl)-2-methylpropionamidine] hydrate, dimethyl-2,2'-azobis(2-methylpropionate), lauroyl peroxide, t-butyl-peroxypivalate, tert-butyl hydroperoxide, or a combination thereof.

In some embodiments, the polymerization reaction stabilizers may be selected from the group consisting of organic polymers and inorganic particulate stabilizers. Nonlimiting examples of suitable stabilizers for the polymerization reaction comprising compounds of formula II, III and IV include, polyvinyl alcohol, polyvinyl alcohol-co-vinyl acetate and the hydrolyzed products thereof, polyvinyl acetate, polyvinylpyrolidinone, salts of polyacrylic acid, cellulose ethers, natural gums, or a combination thereof.

In some embodiments, the polymerization reaction may be carried out in the presence of a salt, such as sodium chloride, potassium chloride, calcium chloride, potassium bromide, sodium bromide, sodium bicarbonate, ammonium peroxodisulfate, or a combination thereof.

In certain embodiments, suitable solvent used in the polymerization reaction include, but are not limited to: water; alcohols, such as methanol, ethanol, 1-propanol, isopropyl alcohol, 1-butanol, or 2-butanol; ethers, such as diethyl ether, diisopropyl ether, methyl tertiary-butyl ether, tetrahydrofuran, 2-methyltetrahydrofuran, cyclopropylmethyl ether, dioxane, or dimethoxyethane; esters, such as methyl acetate, ethyl formate, ethyl acetate, propyl acetate, isopropyl acetate, butyl acetate or isobutyl acetate; ketones, such as acetone, methyl ethyl ketone, methyl isobutyl ketone or diethyl ketone; nitriles, such as acetonitrile or propionitrile; amides, such as formamide, N,N-dimethylformamide, or N,N-dimethylacetamide; sulfoxides, such as dimethyl sulfoxide; aliphatic and aromatic hydrocarbons such as n-pentane, isopentane, n-hexane, isohexane, n-heptane, cyclohexane, methylcyclohexane, cycloheptane, petroleum ethers, benzene, toluene, ethylbenzene, m-xylene, o-xylene or p-xylene; halogenated hydrocarbons such as dichloromethane, 1,2-dichloroethane, trichloroethylene, chloroform or carbon tetrachloride; or mixtures of two or more thereof.

In one embodiment, ether solvent used in forming the reaction mixture comprising polymer of formula V include but not limited to, diethyl ether, diisopropyl ether, methyl tertiary-butyl ether, dibutyl ether, di-tertiary-butyl ether, tetrahydrofuran, 2-methyltetrahydrofuran, cyclopropyl methyl ether, dioxane, dimethoxymethane, dimethoxyethane, glycol ethers such as ethylene glycol monomethyl ether, ethylene glycol diethyl ether, propylene glycol methyl ether, di(propylene glycol) methyl ether, polyethers such as polyethylene glycol, polypropylene glycol, or mixtures thereof.

In one embodiment, the ether solvent used in forming the reaction mixture comprising polymer of formula V is preferably tetrahydrofuran.

In another embodiment, the ether solvent used in forming the reaction mixture comprising polymer of formula V, optionally comprise an additional solvent selected from the group of water, alcohols, esters, amides, ketones, aliphatic/aromatic hydrocarbons, halogenated hydrocarbons, or mixtures thereof.

In certain embodiments, the base useful in the reaction for preparing polymer of formula VI, can be selected from the group, lithium hydroxide, sodium hydroxide, potassium hydroxide, rubidium hydroxide, caesium hydroxide, calcium hydroxide, magnesium hydroxide, strontium hydroxide, barium hydroxide, or a combination thereof. Preferably, an aqueous strong base such as sodium hydroxide potassium hydroxide, or a combination thereof is used.

The weight ratio (w/w) of the compounds of formulae II, III and IV, used in the invention described herein, can be between about 80:10:10 and about 95:2.5:2.5, preferably 90:5:5.

In certain embodiments, Patiromer sorbitex calcium of formula I can be prepared by slurrying the polymer of formula VI or IA, with a polyol such as sorbitol (D-Sorbitol) in a suitable solvent, at a suitable temperature and pressure, filtering the solid and drying to a desired moisture content. Suitable solvent for preparing Patiromer sorbitex calcium of formula I include, but not limited to: water; alcohols, such as methanol, ethanol, 1-propanol, isopropyl alcohol, 1-butanol, or 2-butanol; ethers, such as diethyl ether, diisopropyl ether, methyl tertiary-butyl ether, tetrahydrofuran, 2-methyltetrahydrofuran, cyclopropylmethyl ether, dioxane, or dimethoxyethane; glycol ethers, such as ethylene glycol monomethyl ether, ethylene glycol diethyl ether, propylene glycol methyl ether, or di(propylene glycol) methyl ether, polyethers such as polyethylene glycol, or polypropylene glycol; esters, such as methyl acetate, ethyl formate, ethyl acetate, propyl acetate, isopropyl acetate, butyl acetate or isobutyl acetate; ketones, such as acetone, methyl ethyl ketone, methyl isobutyl ketone or diethyl ketone; nitriles, such as acetonitrile or propionitrile; amides, such as formamide, N,N-dimethylformamide, or N,N-dimethylacetamide; sulfoxides, such as dimethyl sulfoxide; aliphatic and aromatic hydrocarbons such as n-pentane, isopentane, n-hexane, isohexane, n-heptane, cyclohexane, methylcyclohexane, cycloheptane, petroleum ethers, benzene, toluene, ethylbenzene, m-xylene, o-xylene or p-xylene; halogenated hydrocarbons such as dichloromethane, 1,2-dichloroethane, trichloroethylene, chloroform or carbon tetrachloride; or mixtures of two or more thereof.

In various embodiments, the term "alkyl," as used herein, refers to saturated, straight- or branched-chain hydrocarbon. Examples of $C_{1-6}$ alkyl include, but are not limited to, methyl, ethyl, propyl, isopropyl, n-butyl, tert-butyl, neopentyl, hexyl and the like.

In certain embodiments, the substituent "M" of the polymer of formula VI depends on the base used in that step. For example, when sodium hydroxide is used as the base, "M" is a sodium. This sodium ion can be exchanged for another cation such as calcium salt by washing with a solution that substitutes calcium for sodium, for example, by using calcium chloride, calcium acetate, calcium lactate gluconate, or a combination thereof. After the desired ion exchange, the product is washed with a suitable solvent such as alcohol, ether, water or mixtures thereof and dried at a desired temperature.

In certain embodiments, the polymerization mixtures of the present invention may optionally comprise additional components such as surfactants, buffers, polymerization inhibitors or any other components known in the art. The choice of these components is customary to one skilled in the art.

Useful surfactants include: anionic surfactants such as sodium dodecyl sulfate, ammonium lauryl sulfate, sodium laureth sulfate, N-lauroylsarcosine sodium salt, lauryldimethylamine-oxide, ethyltrimethylammoniumbromide, bis(2-ethylhexyl)sulfosuccinate sodium salt, alkyl benzene sulfonate, soaps, fatty acid salts, or a combination thereof; cationic surfactants, such as cetyltrimethylammonium bromide, cetylpyridinium chloride, polyethoxylated tallow amine, benzalkonium chloride, benzethonium chloride, or a combination thereof; zwitterionic or amphoteric surfactants such as dodecyl betaine, dodecyl dimethylamine oxide, cocamidopropyl betaine, coco ampho glycinate, or a combination thereof; non-ionic surfactants such as alkyl poly (ethylene oxide), copolymers of poly(ethylene oxide) and poly(propylene oxide), alkyl polyglucosides (such as octyl glucoside, decyl maltoside, fatty alcohols, or a combination thereof.

Nonlimiting examples of buffers include, 4-(2-hydroxyethyl)-1-piperazineethanesulfonic acid, 2-{[tris(hydroxymethyl)methyl]amino}ethanesulfonic acid, 3-(N-morpholino) propanesulfonic acid, piperazine-N,N'-bis(2-ethanesulfonic acid), sodium phosphate dibasic heptahydrate, sodium phosphate monobasic monohydrate or a combination thereof.

Polymerization inhibitors may be selected from the group of 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, 1-aza-3,7-dioxabicyclo[3.3.0]octane-5-methanol, 2,2'-ethylidene-bis(4,6-di-tert-butylphenol), 2,2'-methylenebis(6-tert-butyl-4-ethylphenol), 2,2'-methylenebis(6-tert-butyl-4-methyl phenol), 2,5-di-tert-butyl-4-methoxyphenol, 2,6-di-tert-butyl-4-(dimethylaminomethyl) phenol, 2-heptanone oxime, 6,6'-dihydroxy-5,5'-dimethoxy-[1,1'-biphenyl]-3,3'-dicarboxaldehyde, distearyl-3,3'-thiodipropionate, ditetradecyl-3,3'-thiodipropionate, ditridecyl-3,3'-thiodipropionate, octadecyl-3-(3,5-di-tert-butyl-4-hydroxyphenyl)propionate, poly(1,2-dihydro-2,2,4-trimethylquinoline), sodium D-isoascorbate monohydrate, tetrakis(2,4-di-tert-butylphenyl)-4,4'-biphenyldiphosphonite, tris(3,5-di-tert-butyl-4-hydroxybenzyl) isocyanurate, tris(4-tert-butyl-3-hydroxy-2,6-dimethylbenzyl) isocyanurate, sodium nitrite or the like.

In various embodiments, the reaction is carried out at suitable temperatures less than about 120° C., less than about 100° C., less than about 80° C., less than about 60° C., less than about 40° C., less than about 30° C., less than about 20° C., less than about 10° C., or any other suitable temperatures.

The chemical transformations described throughout the application may be carried out using substantially stoichiometric amounts of reactants, though certain reactions may benefit from using an excess of one or more of the reactants.

In certain embodiments, the moisture content of the polymers of the present invention can range from about 1 to about 30 wt. %, or from about 5 to about 30 wt. %, or from about 10 to about 25 wt. %, or from about 15 to about 25 wt. % based on the total weight of the composition. However, the moisture content of the polymers is kept in such a range that doesn't affect the free flow of the polymer composition during manufacturing or packaging operations. The moisture content can be measured using conventional techniques or in a manner known to one skilled in the art.

In certain embodiments, polymers obtained herein, may be optionally washed with suitable solvent and dried under suitable drying conditions, at atmospheric pressure or under reduced pressure. The drying may be carried out at atmospheric pressure or under a reduced pressure at temperatures less than about 100° C., or less than about 80° C., or less than about 65° C., or any other suitable temperature without degrading the quality of the polymers. The drying may be carried out for any desired time until the required purity is achieved. For example, it may vary from about 1 to about 20 hours, or about 5 to 24 hours, about 10 to 48 hours, or longer.

In various embodiments, the reactions described herein are maintained or stirred at a suitable temperature from about 20° C. to 100° C. Stirring can be done at a speed of 150 rpm to 500 rpm, preferably about 200 rpm to 400 rpm, more preferably about 250 to 350 rpm.

The dried product may optionally be subjected to a particle size reduction to obtain desired particle sizes and distributions, using conventional technique. The desired particle sizes may also be achieved directly from the reaction mixture by selecting equipment that is able to provide the polymer with the desired particle sizes.

The polymers of the present invention are in the form of substantially spherical particles (such as beads or bead form). The polymer particles have a mean diameter of from about 20 μm to about 200 μm. preferably about 20 μm to about 200 μm, from about 20 μm to about 150 μm, from about 20 μm to about 125 μm, from about 35 μm to about 150 μm, from about 35 μm to about 125 μm, or from about 50 μm to about 125 μm. Particle sizes, including mean diameters, distributions, can be determined using techniques known to one skilled in the art.

In some embodiments of the invention, the polymer of formula I or IA can be administered unformulated without additional carriers or other components. In other instances, a pharmaceutical composition containing the polymer (I or IA), a stabilizing linear polyol (for example sorbitol) and optionally water can be suitably administered.

The invention illustratively described herein suitably may be practiced in the absence of any element or elements, limitation or limitations which is not specifically disclosed herein. Thus, for example, in each instance herein any of the terms "comprising" and "consisting of" may be replaced with either of the terms. In addition, the solvents, temperatures, reaction durations, etc. delineated herein are for purposes of illustration only and one of ordinary skill in the art will recognize that variation of the reaction conditions can produce the desired products accordingly.

Certain specific aspects and embodiments of the present invention will be better understood in connection with the following examples, which are provided only for purposes of illustration and should not be construed as limiting the scope of the application in any manner.

EXAMPLES

Example 1

Preparation of methyl-2-fluoroacrylate polymer with divinylbenzene and 1,7-octadiene (Formula V; R is methyl)

In a reactor with an anchor agitator, nitrogen inlet adopter and other equipment, an aqueous phase was prepared by mixing water (1200 mL), Polyvinyl alcohol (12.5 g) and sodium chloride (46.87 g). This aqueous phase was stirred at 25-30° C. at a speed of 280-300 rpm for 15 minutes. An organic phase was prepared by mixing methyl-2-fluoroacrylate (225 g), divinylbenzene (12.5 g), 1,7-octadiene (12.5 g) and dilauroyl peroxide (2.5 g). Slowly charged the organic phase in to the aqueous phase in a single lot at 25-30° C. the reaction mass was stirred for 15 minutes at 25-30° C. Slowly raised the temperature of the reaction mass to 65° C. and was stirred for 1 hour at the same temperature. Temperature of the reaction mass was increased to 70° C. and was stirred for 30 minutes at 70° C. After 30 minutes temperature of the reaction mass was further increased to 75° C. and was stirred for 30 minutes again at 75° C. Further the temperature of the reaction mass was raised to 75-80° C. and stirred the mass at this temperature for 3 hours. After 3 hours reaction mass was cooled to 25-30° C. Methanol (500 mL) was charged into the reaction mass and stirred for 1 hour at 25-30° C. The polymerization product was isolated by filtration. Water slurry washings (2500 mL×3 times) were given to the wet product. Finally, methanol slurry washings (1250 mL×2 times) were given to the wet product. The wet product was dried under reduced pressure at 25-30° C. for 15-20 hours to afford the title polymer in white colour as spherical free flowing beads.
Yield: 230.85 g (103% w/w)

Example 2

Preparation of sodium salt of methyl-2-fluoroacrylate polymer with divinylbenzene and 1,7-octadiene (Formula VI; M is sodium)

In a round bottom flask equipped with an overhead mechanical stirrer, reflux condenser and nitrogen inlet adopter was charged methyl-2-fluoroacrylate polymer with divinylbenzene and 1,7-octadiene (20 g), tetrahydrofuran (100 mL) and 20% w/v sodium hydroxide solution (100 mL). The reaction mixture was stirred at a speed of 200-220 rpm at mild reflux temperature (60-62° C.) for 10-15 hours and then cooled to 25-30° C. The hydrolysis product was isolated by filtration. Slurry washed the wet product with water (200×3 times). Finally, slurry washed the wet product with methanol (100 mL). The wet product was dried under reduced pressure at 25-30° C. for 15-20 hours to afford of the title polymer in off-white colour as spherical free flowing beads.
Yield: 25.5 g (127.5% w/w)

Example 3

Preparation of sodium salt of methyl-2-fluoroacrylate polymer with divinylbenzene and 1,7-octadiene (Formula VI; M is sodium)

In a round bottom flask equipped with an overhead mechanical stirrer, reflux condenser without nitrogen inlet adopter (in absence of inert atmosphere), methyl-2-fluoroacrylate polymer with divinylbenzene and 1,7-octadiene (15 g), tetrahydrofuran (75 mL) and 20% w/v sodium hydroxide solution (75 mL) were charged. The reaction mixture was stirred at a speed of 200-300 rpm mild reflux temperature (58-62° C.) for 10-15 hours and then cooled to 25-30° C. The hydrolysis product was isolated by filtration. Slurry washed the wet product with water (150×3times). Finally, slurry washed the wet product with methanol (150 mL). The wet product was dried under reduced pressure at 25-30° C. for 15-20 hours to afford the title polymer in off-white colour as spherical free flowing beads.
Yield: 18.08 g (120.33% w/w)

Example 4

Preparation of Patiromer (Formula IA)

In a reactor, a solution of calcium chloride in water (93.6 g in 400 mL water) was taken and sodium salt of methyl-2-fluoroacrylate polymer with divinylbenzene and 1,7-octadiene (40 g) was added at 25-30° C. The reaction mixture was stirred in an inert atmosphere (nitrogen) for 4 hours at a speed of 300-325 rpm. The resulting product was isolated by filtration, slurry washed with water (400 mL×3 times) and then with methanol (200 mL). The wet product was dried under reduced pressure at 25-30° C. for 15-20 hours to afford the title polymer in off-white colour as spherical free flowing beads.
Yield: 40 g (100% w/w)

Example 5

Preparation of Patiromer Sorbitex Calcium (Formula I)

To a round bottom flask equipped with an overhead stirrer and nitrogen inlet adopter was charged D-Sorbitol (7.5 g) and water (12.5 mL). The mixture was stirred at 15-20° C. till to get a clear solution. Patiromer (2.5 g) was charged in one portion to the sorbitol solution at 15-20° C. and stirred the reaction mass for 3 hours at the same temperature under nitrogen blanket with 250 rpm. The product was isolated by filtration and was dried under reduced pressure at 25-30° C. for 48-52 hours to afford the title polymer in off-white colour as spherical free flowing beads.
Yield: 3.16 g (126.4% w/w).

We claim:
1. A process for preparing Patiromer of formula IA,

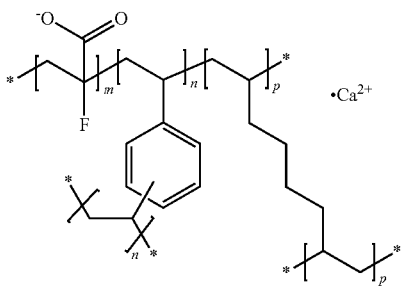

wherein,
m is the number of 2-fluoro-2-propenoate groups, and m is equal to 0.91,
n and p are the number of crosslinking groups, and n+p is equal to 0.09, and
* is an extended polymeric network,
the process comprising:
forming a reaction mixture comprising a polymer of formula V,

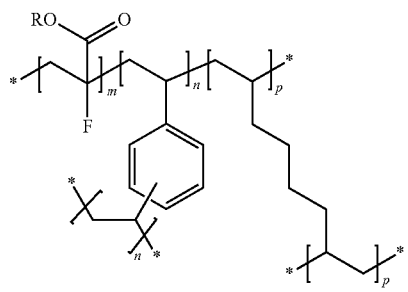

wherein,
R is $C_{1-6}$ alkyl, and
m, n, p and * are as defined hereinbefore,
and a base in a solvent to provide a polymer of formula VI,

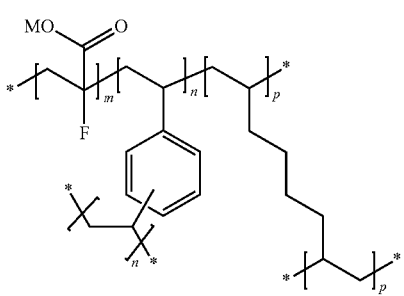

wherein,
M is selected from the group consisting of hydrogen, lithium, sodium, potassium, rubidium, caesium, calcium, magnesium, strontium, barium, and a combination thereof, and
m, n, p and * are as defined hereinbefore,
wherein the solvent is an ether solvent, and
converting the compound of formula VI to Patiromer of formula IA.

2. The process as claimed in claim 1, wherein said base is selected from the group comprising lithium hydroxide, sodium hydroxide, potassium hydroxide, rubidium hydroxide, caesium hydroxide, calcium hydroxide, magnesium hydroxide, strontium hydroxide, barium hydroxide, or a combination thereof.

3. The process as claimed in claim 1, wherein said ether solvent is selected from the group comprising diethyl ether, diisopropyl ether, methyl tertiary-butyl ether, tetrahydrofuran, 2-methyltetrahydrofuran, dioxane, or mixtures thereof.

4. The process as claimed in claim 1, wherein said ether solvent is tetrahydrofuran.

5. The process as claimed in claim 1, wherein the reaction mixture may further comprise an additional solvent selected from the group comprising water, methanol, ethanol, isopropyl alcohol, methyl acetate, ethyl acetate, or mixtures thereof.

6. A process for preparing Patiromer of formula IA,

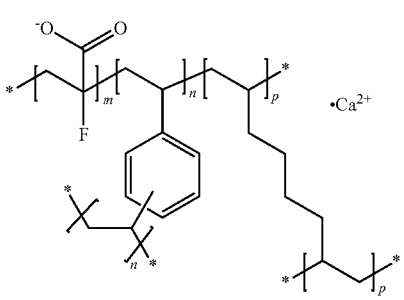

wherein,
m is the number of 2-fluoro-2-propenoate groups, and m is equal to 0.91,
n and p are the number of crosslinking groups, and n+p is equal to 0.09, and
* is an extended polymeric network,
the process comprising:
a. reacting a polymerization mixture comprising the compounds of formulae II, III and IV,

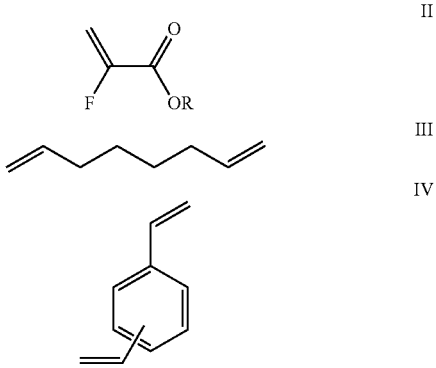

wherein R is $C_{1-6}$ alkyl,
in presence of a free radical initiator and optionally a stabilizer, in a solvent to obtain a polymer of formula V,

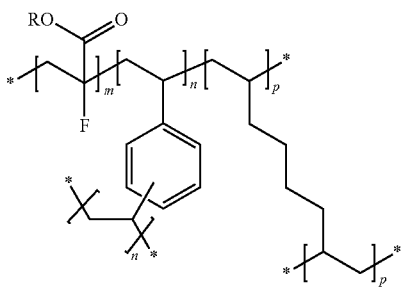

V wherein, R, m, n, p and * are as defined hereinbefore;

b. converting the polymer of formula V to a polymer of formula VI, in presence of a base in a solvent,

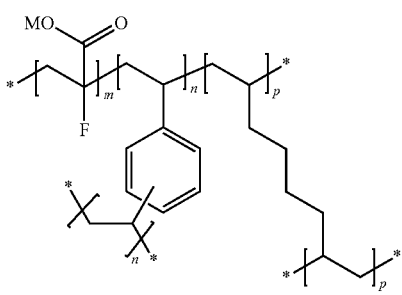

VI wherein,

M is selected from the group consisting of hydrogen, lithium, sodium, potassium, rubidium, caesium, calcium, magnesium, strontium, barium, and a combination thereof; m, n, p and * are as defined hereinbefore, wherein the said organic solvent is ether;

wherein, the solvent is an ether solvent, c. converting the compound of formula VI to Patiromer of formula IA, and d. optionally slurrying the Patiromer of formula IA with a polyol to obtain Patiromer sorbitex calcium of formula I:

calcium-sorbitol counterion:

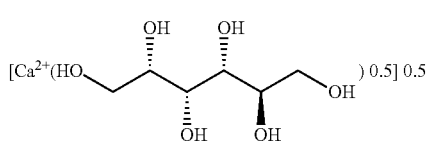

patiromer anion:

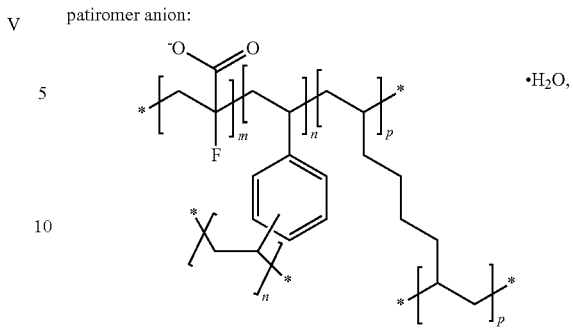

wherein, $H_2O$ is associated water and m, n, p, and * are as defined hereinbefore.

7. The process as claimed in claim 6, wherein $C_{1-6}$ alkyl is selected from the group comprising methyl, ethyl, propyl, isopropyl, n-butyl, tert-butyl, neopentyl or hexyl.

8. The process as claimed in claim 6, wherein said free radical initiator is selected from the group comprising 2,2'-azobis(2,4-dimethylvaleronitrile), 2,2'-azobis[2-(2-imidazolin-2-yl)propane] dihydrochloride, 2,2'-azobis(2-methyl-N-(2-hydroxyethyl)propionamide), 2,2'-azobis(2-methylpropionitrile), 2,2'-azobis(2-methylpropionamidine) dihydrochloride, 2,2'-azobis[2-(2-imidazolin-2-yl)propane] dihydrochloride, 2,2'-azobis[2-(2-imidazolin-2-yl)propane] disulfate dihydrate, 2,2'-azobis[N-(2-carboxyethyl)-2-methylpropionamidine] hydrate, dimethyl-2,2'-azobis(2-methylpropionate), lauroyl peroxide, t-butyl-peroxypivalate, tert-butyl hydroperoxide, or a combination thereof.

9. The process as claimed in claim 6, wherein the stabilizer employed in step a) is selected from the group comprising polyvinyl alcohol, polyvinyl alcohol-co-vinyl acetate, polyvinyl acetate, polyvinylpyrolidinone, salts of polyacrylic acid, cellulose ethers, natural gums, or a combination thereof.

10. The process as claimed in claim 6, wherein step a) is carried out in presence of a salt selected from the group comprising sodium chloride, potassium chloride, calcium chloride, potassium bromide, sodium bromide, sodium bicarbonate, ammonium peroxodisulfate, or a combination thereof.

11. The process as claimed in claim 6, wherein the solvent used in step a) is selected from the group comprising water, methanol, ethanol, isopropyl alcohol, diethyl ether, methyl tertiary-butyl ether, tetrahydrofuran, 2-methyltetrahydrofuran, dioxane, ethyl acetate, or mixtures thereof.

12. The process as claimed in claim 6, wherein the base used in step b) is selected from the group comprising lithium hydroxide, sodium hydroxide, potassium hydroxide, rubidium hydroxide, caesium hydroxide, calcium hydroxide, magnesium hydroxide, strontium hydroxide, barium hydroxide, or a combination thereof.

13. The process as claimed in claim 6, wherein the ether solvent used in step b) is selected from the group comprising diethyl ether, diisopropyl ether, methyl tertiary-butyl ether, tetrahydrofuran, 2-methyltetrahydrofuran, dioxane, or mixtures thereof.

14. The process as claimed in claim 6, wherein the ether solvent used in step b) is tetrahydrofuran.

15. The process as claimed in claim 6, wherein the process may further comprise an additional solvent selected from the group comprising water, methanol, ethanol, isopropyl alcohol, methyl acetate, ethyl acetate, or mixtures thereof.

16. The process as claimed in claim 6, wherein the weight ratio (w/w) of the compounds of formulae II, III and IV, employed in the polymerization reaction is between about 80:10:10 and about 95:2.5:2.5.

17. The process as claimed in claim 1, wherein $C_{1-6}$ alkyl is selected from the group comprising methyl, ethyl, propyl, isopropyl, n-butyl, tert-butyl, neopentyl or hexyl.

18. The process as claimed in claim 6, wherein the polyol used in step d. is d-sorbitol.

\* \* \* \* \*